Nov. 13, 1956 2,770,781
R. B. ROBERTSON-SHERSBY-HARVIE ET AL
WAVE DELAYING STRUCTURE FOR RECTANGULAR WAVE-GUIDES
Filed July 16, 1951

ROBERT BRUCE ROBERTSON-SHERSBY-HARVIE,
JOHN DAIN,
Inventors

By

Attorney

United States Patent Office 2,770,781
Patented Nov. 13, 1956

2,770,781

WAVE DELAYING STRUCTURE FOR RECTANGULAR WAVE-GUIDES

Robert Bruce Robertson-Shersby-Harvie, Great Malvern, and John Dain, Abingdon, England Application July 16, 1951, Serial No. 236,932

1 Claim. (Cl. 333—31)

In electronic discharge devices of the travelling-wave magnetron type it is necessary to provide a structure to propagate an electromagnetic wave with a phase velocity approximately equal to the translation velocity of electrons moving in crossed electric and magnetic fields. For various reasons the velocity is chosen to be about one quarter of the velocity of light.

The discharge devices are preferably rectangular in cross-section and the guiding structure should conform to this cross-section. It is well known that a rectangular waveguide of suitable dimensions will propagate waves with low phase velocities provided it is loaded on one or both broad faces by an inductive sheet. The amplitude of the disturbance falls off almost exponentially from the sheet. The inductive sheet may be made by using a series of nearly resonant slots with the open ends lying in the plane of the sheet. The slots may or may not extend the full width of the guide. Such structures have been tried, but they are not entirely satisfactory, for the low phase velocities required in the amplifier. This is because the structure stores a considerable amount of useless energy, has a very low group velocity and is extremely sensitive to irregularities causing reflections of the traveling wave that may be of sufficient magnitude to upset operation of the valve. The copper losses are also high.

The present invention has for an object to overcome such difficulties. It consists of placing the inductive sheet in the middle of the guide and propagating similar slow waves on each side of it. In this case to give the same velocity the sheet is required to have a surface inductance one half of that necessary in the previous form.

The invention may also be regarded as a device for guiding slow waves comprising an elongated flat sheet having inductive faces. Such a device may be used in free space in which case the electric and magnetic fields fall off exponentially from the device into space.

The invention will now be described by way of example with reference to the accompanying drawings wherein.

Figure 1:
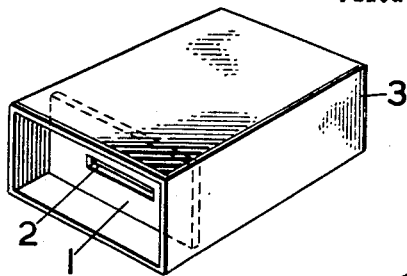
Fig. 1 is a perspective view of an iris in a section of waveguide.

To examine how the sheet may be set up consider the case of a resonant iris in a rectangular wave guide. In one form this is as shown in Fig. 1 of the accompanying drawings, the iris comprising a thin metal sheet 1 with a slot 2 disposed in a section of guide 3. At the resonant frequency the iris is transparent and for lower frequencies it presents an inductive shunt impedance to the incident wave. Now suppose a series of such slots are cut in a sheet running along the middle of the guide as shown in Fig. 2.

There will be a frequency at which the sheet is transparent and for lower frequencies the sheet will be inductive. Choice of dimensions provides for the desired loading of the waveguide.

Figure 2:
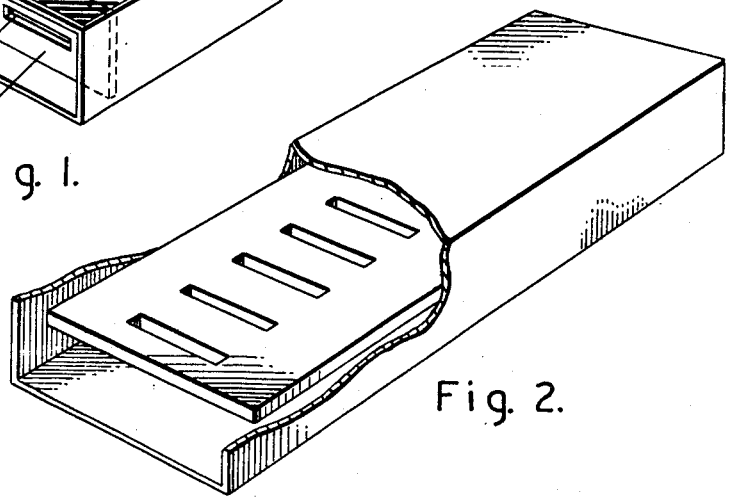
Fig. 2 is a fragmentary perspective view of an embodiment of this invention.

In the arrangement of Fig. 2 the slotted sheet will not interrupt propagation of the $H_{10}$ mode normally used. If the metal sheet is thickened in the central portion as shown in Fig. 3 to increase the self capacity of the slots and the length of the slots is reduced below one half of the free space wavelength, the dimensions of the waveguide can then be reduced so that the $H_{10}$ mode is beyond cut-off and the wanted slow wave is the only remaining non-evanescent disturbance.

Figure 4:
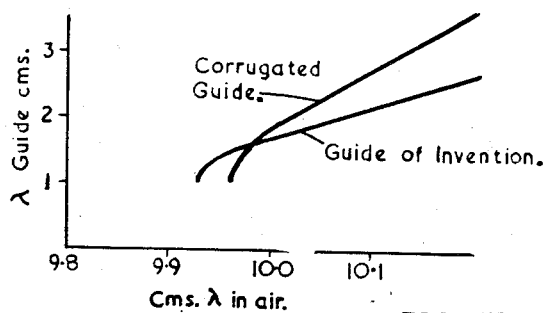
Fig. 4 is a graph comparing the characteristics of an embodiment of the invention with those of known waveguides.

Experimental results indicate that in a waveguide loaded in accordance with the invention the guided wavelength changes more slowly as the air wavelength is changed than the guided wavelength does in waveguides loaded in the known manner by means of corrugations. This result is shown graphically in Fig. 4 and indicates that the structure of the invention is less sensitive to dimensional irregularities and is consequently easier and cheaper to manufacture apart from its inherent relative ease of manufacture due to its simpler mechanical form. The result also indicates that the losses due to the finite conductivity of the walls are less than in a corrugated waveguide.

Figure 3:
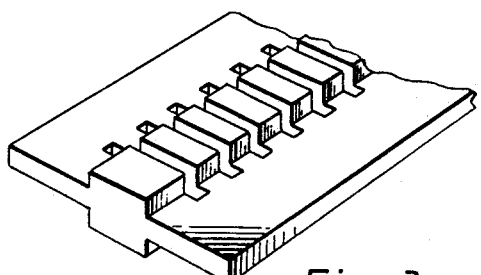
Fig. 3 is a fragmentary perspective view of a modified guiding or loading device.

It will be understood that the loading devices shown in Figs. 2 and 3 may be used per se as guiding devices for slow waves as hereinbefore stated.

We claim:

A loaded waveguide comprising an elongated flat metal sheet arranged in a central plane of the guide and formed with a series of transverse inductive slots such that each face present an inductive impedance to the guide and similar slow waves may be propagated in the guide on each side of the sheet wherein said sheet is thickened near the center of the slots to increase the self capacity of the slots, but while leaving the sheet adjacent the ends of the slots at substantially the same thickness as the remainder of the sheet.

References Cited in the file of this patent

UNITED STATES PATENTS

| | | |
|---|---|---|
| 2,438,735 | Alexanderson | Mar. 30, 1948 |
| 2,568,090 | Riblet | Sept. 18, 1951 |
| 2,573,012 | Gutton et al. | Oct. 30, 1951 |
| 2,573,746 | Watson | Nov. 6, 1951 |
| 2,623,121 | Loveridge | Dec. 23, 1952 |
| 2,659,817 | Cutler | Nov. 17, 1953 |
| 2,708,236 | Pierce | May 10, 1955 |

FOREIGN PATENTS

| | | |
|---|---|---|
| 890,924 | France | Feb. 22, 1944 |